United States Patent
Ohno et al.

(10) Patent No.: US 7,190,462 B2
(45) Date of Patent: Mar. 13, 2007

(54) FIBER OPTIC GYROSCOPE HAVING OPTICAL INTEGRATED CIRCUIT, DEPOLARIZER AND FIBER OPTIC COIL

(75) Inventors: Aritaka Ohno, Tokyo (JP); Ryuji Usui, Kanagawa (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 240 days.

(21) Appl. No.: 10/797,731

(22) Filed: Mar. 9, 2004

(65) Prior Publication Data

US 2007/0030491 A1   Feb. 8, 2007

(30) Foreign Application Priority Data

Mar. 27, 2003  (JP)  ............................. 2003-087243

(51) Int. Cl.
*G01C 19/72* (2006.01)
*G02B 6/00* (2006.01)

(52) U.S. Cl. .......................... 356/460; 385/12
(58) Field of Classification Search ................ 356/460, 356/462, 464; 250/227.19, 227.27; 385/12
See application file for complete search history.

(56) References Cited

U.S. PATENT DOCUMENTS

| | | | |
|---|---|---|---|
| 5,136,667 A * | 8/1992 | Ohno et al. ................. | 356/460 |
| 5,245,407 A * | 9/1993 | Nishiura et al. ............ | 356/460 |
| 5,475,772 A | 12/1995 | Hung et al. | |
| 5,854,678 A * | 12/1998 | Liu et al. .................... | 356/462 |
| 6,175,410 B1 * | 1/2001 | Szafraniec et al. ......... | 356/459 |
| 6,801,319 B2 * | 10/2004 | Szafraniec et al. ......... | 356/460 |
| 6,990,269 B2 * | 1/2006 | Ohno et al. ................. | 356/483 |

FOREIGN PATENT DOCUMENTS

DE    195 02 519 A1    8/1996

(Continued)

OTHER PUBLICATIONS

Ohno, Aritaka, et al., "Intermediate and moderate grade Fiber Optic Gyroscope for industrial applications," SPIE vol. 2292 Fiber Optic and Laser Sensors XII (1994), pp. 166-176.

(Continued)

*Primary Examiner*—Gregory J. Toatley, Jr.
*Assistant Examiner*—Patrick Connolly
(74) *Attorney, Agent, or Firm*—David N. Lathrop, Esq.; Gallagher & Lathrop (57) ABSTRACT

A light source 10 is connected sequentially through a single mode optical fiber and a coupler to one end of a polarization maintaining optical fiber, the other end of which is connected to an optical waveguide of an optical integrated circuit having a branching optical waveguide which has a polarizing function with the polarization axis of the optical fiber being coincident with the direction of the TE mode in the optical waveguide. One end of each of polarization maintaining optical fibers are connected to two other ends of the optical waveguide with the polarization axis of the optical fibers being coincident with the direction of the TE mode in the optical waveguide. The other ends of the optical fibers are connected to one end of each of polarization maintaining optical fibers with their polarization axis displaced by an angle of 45° from each other. The other ends of the optical fibers are connected to the opposite ends of a single mode fiber optic coil.

6 Claims, 5 Drawing Sheets

FOREIGN PATENT DOCUMENTS

| | | |
|---|---|---|
| EP | 0 260 885 A2 | 3/1988 |
| EP | 0 760 461 A1 | 3/1997 |
| JP | 8029184 | 2/1996 |
| JP | 2000-513812 | 10/2000 |
| WO | WO 98/00682 | 1/1998 |
| WO | WO-03/060427 A1 | 7/2003 |

OTHER PUBLICATIONS

Usui, Ryuji, et al., "Intermediate Grade FOG with Single Mode Fiber Coil," SPIE vol. 2070 Fiber Optic and Laser Sensors XI (1993), pp. 152-163.

* cited by examiner

FIBER OPTIC GYROSCOPE HAVING OPTICAL INTEGRATED CIRCUIT, DEPOLARIZER AND FIBER OPTIC COIL

BACKGROUND OF THE INVENTION

The present invention relates to a fiber optic gyroscope including the function to serve as a polarizer and a substrate-based optical integrated circuit on which a branching optical waveguide is formed for detecting an angular rate about a coil axis which is applied to a fiber optic coil.

In the fiber optic gyroscope, light beams impinge on opposite ends of the fiber optic coil, and propagate therethrough to be emitted from the opposite ends. A phase difference between the both emitted light beams remains to be zero when there is no angular rate which is applied to the fiber optic coil about the axis thereof. However, upon application of an angular rate, the phase difference between the both emitted beams changes in accordance with the angular rate applied. Hence, the angular rate applied to the fiber optic coil is detected by detecting the phase difference. When the fiber optic coil exhibits birefringence, a light beam which propagates through the coil has a propagation velocity for one and another propagation velocity for the other of two mutually orthogonal linearly polarized components. Accordingly, similar linearly polarized beams each representing one of linear polarizations, which are emitted after propagation through the fiber optic coil, are led into interference with each other in order to detect the angular rate. To obtain an interference beam between the beams having the selected linear polarization, a polarizer is used. The fiber optic coil is formed by an optical fiber that maintains the plane of polarization so that a linear polarization that is chosen by the polarizer can propagate through the fiber optic coil.

However, an optical fiber which maintains the plane of polarization is much more expensive than a single mode optical fiber. In a single mode fiber optic coil in which a single mode optical fiber is used as a fiber optic coil in consideration of such expensiveness, birefringence occurs, though slightly, when the coil is flexed, leading to the consequence that the linear polarization of the beam propagating through the coil is greatly susceptible to some influence to change. Current practice uses depolarizers to produce one and the other linear polarization of an equal amplitude or to achieve non-polarization before the beams impinge on the opposite ends of the fiber optic coil.

There is a proposal for a substrate-based optical integrated circuit having an optical waveguide which has the function to serve as a branching filter which produces an interference between light beams emitted from the opposite ends of a fiber optic coil after light from a light source is branched to impinge on the opposite ends of the fiber optic coil and as a polarizer which produces a given linear polarization. When this substrate-based optical integrated circuit is used with a single mode optical fiber to form a fiber optic gyroscope, a light beam which impinges on the optical waveguide on the substrate-based optical integrated circuit from the light source propagates in TE mode, which represents a propagation mode of the optical waveguide, and is branched into two beams to impinge on the opposite ends of the fiber optic coil while a light beam in TM mode, representing an extinction mode of the optical waveguide, leaks out of the optical waveguide, and is reflected by the bottom surface of the substrate of the substrate-based optical integrated circuit to impinge on the fiber optic coil. In other words, the extinction ratio of the polarizer is degraded as a result of the incidence of not only the linear polarization which is based on the TE mode beam, but also of the linear polarization which is orthogonal thereto, which occurs as the incidence of a stray beam from the leaking TM mode beam. To solve this problem, U.S. Pat. No. 5,475,772, issued Dec. 12, 1995, proposes forming a space filter in the bottom surface of the substrate of the optical integrated circuit. However, it is found subsequently that the leaking TM mode beam not only impinges on the fiber optic coil as the TM mode beam, but is also converted into the TE mode before it impinges on the fiber optic coil, thus producing an adverse influence upon the original TE mode beam which has propagated through the optical waveguide to degrade the extinction ratio of the polarizer.

A fiber optic gyroscope which overcomes these difficulties associated with the use of the substrate-based optical waveguide is described in the Proceedings of SPIE, Vol. 2292, pp. 166–176. This fiber optic gyroscope will now be described with reference to FIG. 1.

Figure 1:
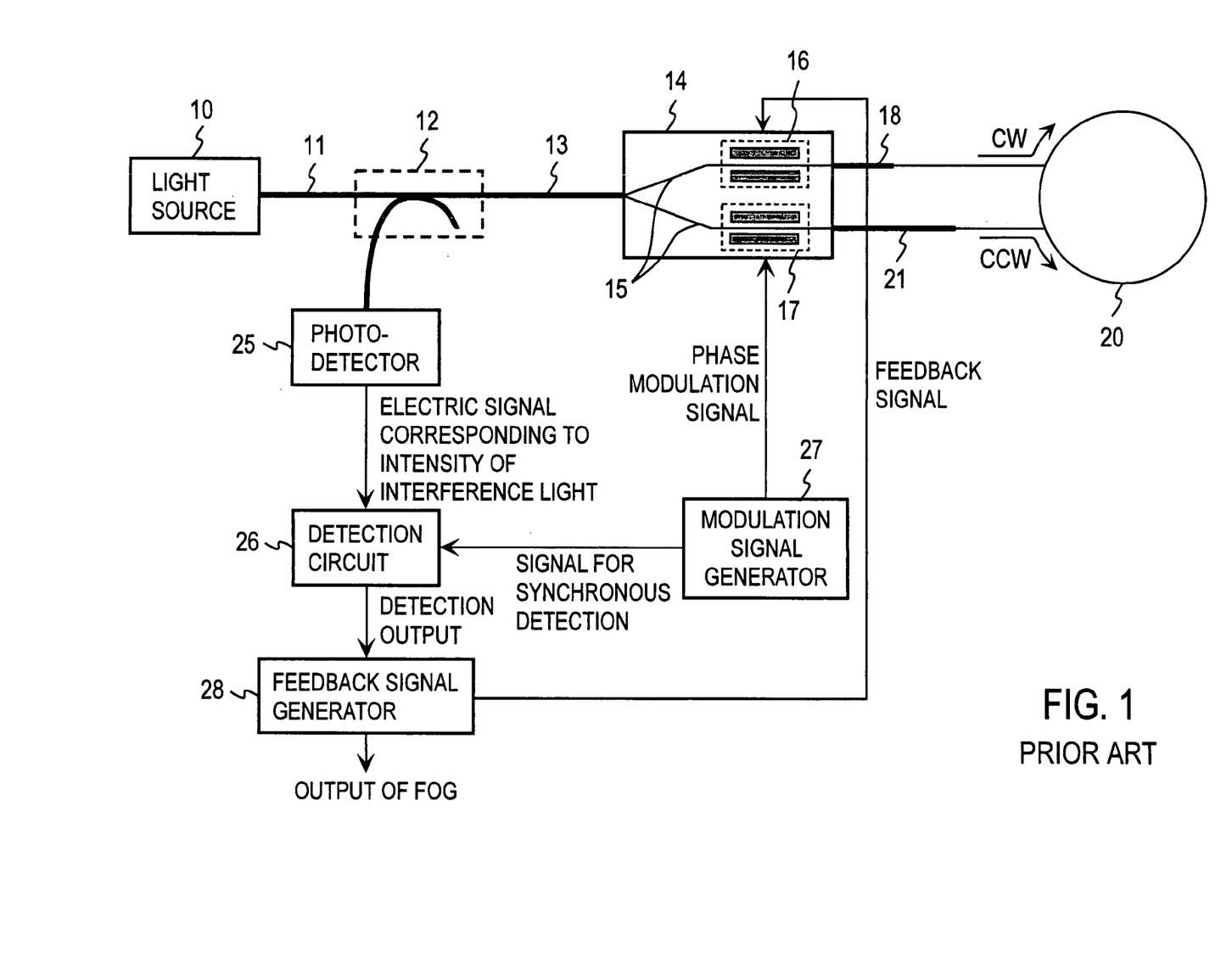
FIG. 1 is a block diagram of an exemplary arrangement of a prior art closed loop fiber optic gyroscope.

A light beam which is emitted from a light source 10 propagates through a first optical fiber 11, an optical fiber coupler 12 and a second optical fiber 13 to impinge on a substrate-based optical integrated circuit 14. The first optical fiber 11, the optical fiber coupler 12 and the second optical fiber 13 are all formed by optical fibers which maintain the plane of polarization. The optical fiber coupler 12 comprises a pair of optical fibers which maintain the plane of polarization and which are fused together intermediate their length and thus the cores of the both fibers are disposed close to each other. The optical integrated circuit 14 comprises a substrate of optical crystal of lithium niobate ($LiNbO_3$) on which a Y-branch optical waveguide 15 is fabricated by the proton exchange method and light modulators 16 and 17 are formed in the region of the respective branches of the optical waveguide.

The light beam which is incident on the Y-branch optical waveguide 15 is branched into a first and a second light beam. The first light beam is incident on one end of a fiber optic coil 20 through a third optical fiber 18, and then propagates through the coil 20 in the clockwise direction (which is referred to hereafter as CW direction). The second branched light beam is incident on the other end of the fiber optic coil 20 through a fourth optical fiber 21 and propagates therethrough in the counter-clockwise direction (here after referred to as CCW direction). The third and the fourth optical fiber 18 and 21 are constructed by optical fibers which maintain the plane of polarization. It should be understood that these optical fibers 18 and 21 which maintain the plane of the polarization are connected to the optical waveguide 15 of the optical integrated circuit 14 such that their inherent axes (generally, the direction of the electric field of the linear polarization having a higher propagation velocity) form an angle of 45° with respect to the direction of the electric field of the propagating TE mode in the optical waveguide 15, thus functioning as a depolarizer together with the optical waveguide 15. The fiber optic coil 20 is constructed with a single mode optical fiber.

As the fiber optic coil 20 rotates about an axis thereof, there occurs a phase difference between the light beam propagating in the CW direction and the light beam propagating in the CCW direction through the fiber optic coil 20, and when these light beams impinge on the Y-branch optical waveguide to be coupled together, an interference beam is produced. The interference beam is branched by the optical fiber coupler 12 to be incident on a light receiver 25, which in turn delivers an electrical signal which depends on the intensity of the interference beam. The output signal from the light receiver 25 is supplied to a detection circuit 26.

The light modulator 17 is used in order to enhance a detection sensitivity. A phase modulation signal (which may be a sinusoidal signal, for example) is applied to the light modulator 17 from a modulation signal generator 27, thus phase modulating the light beam which is branched to propagate through one of optical waveguides. A signal which is synchronized with the phase modulation signal is supplied from the modulation signal generator 27 to the detection circuit 26 to enable a synchronous detection of the electrical signal delivered from the light receiver 25.

A detection output from the detection circuit 26 which depends on the input angular rate is supplied to a feedback signal generator 28, which then generates a feedback signal which depends on the magnitude of the detection output which is input thereto. This feedback signal is supplied to the light modulator 16 to allow a control to be exercised so that the detection output from the detection circuit 26 becomes equal to zero. An output signal from the fiber optic gyroscope is derived from the feedback signal generated by the feedback signal generator 28. In the arrangement shown in FIG. 1, every optical path disposed between the light source 10 and the optical integrated circuit 14 and extending through the optical fiber coupler 12 is formed by an optical fiber which maintains the plane of polarization. An optical fiber which is designed to maintain the plane of polarization utilizes its birefringence to avoid a change in the plane of polarization during the propagation of a light beam. However, because of the birefringence, there is produced a difference in a propagation velocity between the two orthogonal linear polarizations which propagate through the optical fiber. The optical path located between the light source 10 and the optical integrated circuit 14 requires a length on the order of 1 m, and accordingly, as for the coherence of a light beam which is emitted from a light source such as a super-luminescence diode (SLD) as used in a usual fiber optic gyroscope, the coherence between the both linear polarizations is eliminated if the light beam emitted from the light source propagates through the polarization maintaining optical fiber through a distance on the order of ten and several centimeters inasmuch as a distance between the wave fronts of the both linear polarizations which results from the differential propagation velocities of the both linear polarizations is well in excess of the coherence. Consequently, one of the linear polarizations from the polarization maintaining optical fiber 13 propagates thorough the optical waveguide in the TE mode which represents the propagation mode in the optical waveguide of the optical integrated circuit 14, and if the other linear polarization is incident on the optical waveguide in its TM mode to leak out of the optical waveguide to produce a stray beam in the TM mode or is converted into the TE mode to be recoupled irregularly to the optical waveguide or the polarization maintaining optical fibers 18 or 21, the recoupling causes no influence whatsoever on the detection of the angular rate because there is no coherence between the linear polarization which propagates through the optical waveguide and the stray beam. As a consequence, the need to form a space filter in the bottom surface of the substrate of the optical integrated circuit 14 in order to suppress the influence of the stray beam is avoided.

In the fiber optic gyroscope shown in FIG. 1, the polarization maintaining optical fibers 18 and 21 have a length L which is chosen to remove the coherence between the two orthogonal linear polarizations which propagate therethrough to a satisfactory degree. The length is chosen to satisfy the following requirement:

$$L\lambda/B > Lc \quad (1)$$

where B represents a beat length (typically 2 mm), $\lambda$ the wavelength of the light beam (typically 0.83 µm), and Lc the coherence length of the beam (typically 50 µm for a fiber optic gyroscope). When these typical values are substituted into the above inequality, we have L>0.12 m. In the above inequality, L/B represent a phase difference occurring due to differential propagation velocities of the orthogonal linear polarizations, and $L\lambda/B$ a distance between wave fronts of the orthogonal linear polarizations.

The both polarization maintaining optical fibers 18 and 21 are connected to the optical waveguides so that their polarization axis form an angle of 45° with respect to the direction of the electric field of the TE mode in the optical waveguide of the optical integrated circuit 14. Accordingly, the combination of the optical waveguide and either polarization maintaining optical fiber 18 or 21 forms a depolarizer, and light beams from the optical integrated circuit 14 impinge on the opposite ends of the single mode fiber optic coil 20 in a non-polarized condition.

When the described arrangement is used, if the fiber optic coil 20 is constructed with a single mode optical fiber, the angular rate can be detected with a good accuracy. Above described difficulties involved with the use of a single mode fiber optic coil and the use of a substrate-based optical integrated circuit which has a combined function serving as a polarizer and a branching filter appear as a variation in the bias error of the fiber optic gyroscope. Specifically, when no angular rate is applied, the fiber optic gyroscope should deliver a detection output of zero, but there is a detection output as a bias, and the bias error varies, thus degrading the accuracy of detection.

Literatures quoted above do not mention about the length of the both polarization maintaining optical fibers 18 and 21, but there is a description about such length in the Proceedings of SPIE, Vol. 2070, pp. 152–163. Specifically, the lengths of the both polarization maintaining optical fibers 18 and 21 are chosen in the ratio of 1:2 so that they can function as LYOT-type depolarizer, and the difference between the both lengths is chosen to provide a phase difference which avoids a mutual interference between the both linear polarizations for the worst phase conditions for the linear polarizations caused by the refringence of the single mode fiber optic coil 20.

Figure 2:
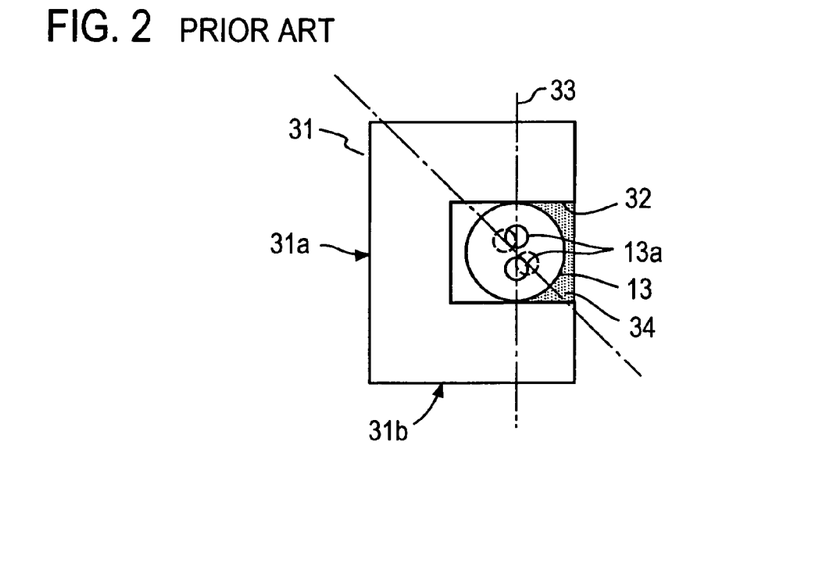
FIG. 2 is an enlarged view showing the end face of a polarization maintaining optical fiber when the polarization axis of the polarization maintaining optical fiber is aligned parallel to a reference surface of a carrier.

The connection of the polarization maintaining optical fiber to the end face of the optical wave guide 15 of the substrate-based optical integrated circuit 14 takes place by mounting a carrier formed of the same material as the substrate of the optical integrated circuit 14 on the end of the polarization maintaining optical fiber to be adhesively secured, followed by adhesively securing the end face of the carrier to the end face of the substrate-based optical integrated circuit 14. More specifically, as illustrated in FIG. 2, a carrier 31 comprises a square pillar, one side of which is formed with a fiber retaining groove 32, into which one end of the polarization maintaining optical fiber 13 is inserted. While maintaining the end face of the optical fiber 13 in alignment with one end face of the carrier 31, and while visually recognizing the end faces of two stress applicators 13a which are disposed within the optical fiber 13a on the opposite sides of the axis and extending parallel to the axis on a microscope, the optical fiber 13- and the carrier 31 are secured together using an adhesive 34 so that a direction 33 in which the two stress applicators 13a are arrayed remains parallel to one lateral surface (reference surface) of the carrier 31. In this instance, when the hair line of the microscope is maintained in coincidence with the reference surface 31a of the carrier 31, the direction of array 33 can be made parallel to the reference surface 31 in a facilitated manner and with good accuracy.

Figure 3A:
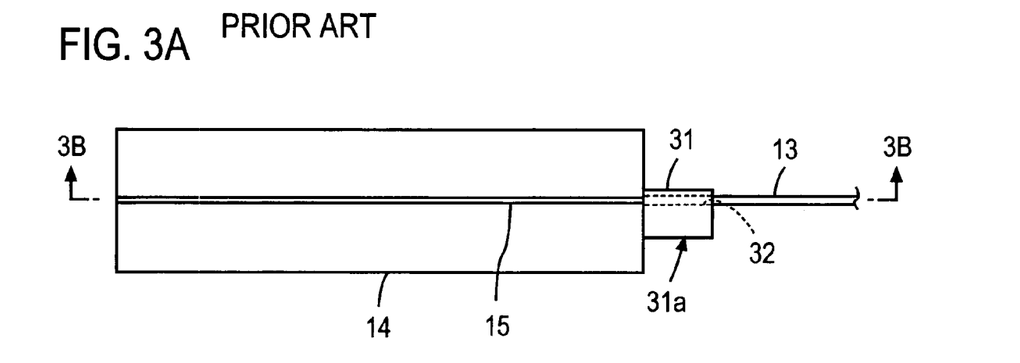
FIG. 3A is a plan view of the polarization maintaining optical fiber mounted on a carrier and connected to the substrate of an optical integrated circuit.
Figure 3B:
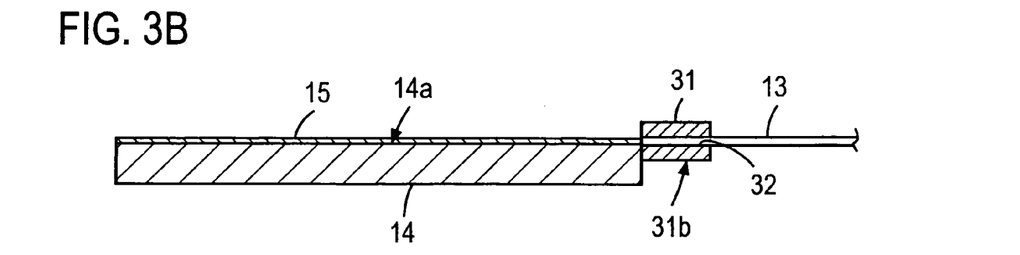
FIG. 3B is a cross section taken along a line 3B—3B in FIG. 3A.

Subsequently, the bottom surface of the substrate of the optical integrated circuit 14 is mounted on a connector in alignment with a reference surface thereof, and the carrier 31 is mounted on the connector so that a lateral surface 31b which is perpendicular to the reference surface 31a of the carrier 31 is in alignment with the reference surface of the connector. The connector is then operated to controllably move the carrier 31 in the vertical and the horizontal direction with respect to the reference surface of the connector so that the optical waveguide 15 and the optical fiber 13 are located in alignment with each other as shown in FIGS. 3A and 3B, and the end faces of the carrier 31 and the optical fiber 33 are brought into contact with the end face of the optical integrated circuit 14, which are then adhesively secured together. In this manner, the polarization axis of the polarization maintaining optical fiber 13 coincides with the direction of the electric field of the TE mode of the optical waveguide 15. Normally, the direction which is perpendicular to the direction of array 33 of the two stress applicators 13a (rapid phase axis) is chosen to be coincident with the direction of the electric field of the TE mode. This case is shown in FIGS. 3A and 3B.

When connecting the polarization maintaining optical fiber 18 or 21 to the optical waveguide 15, the carrier 31 is initially mounted on the polarization maintaining optical fiber 18. In this instance, the polarization maintaining optical fiber 18 and the carrier 31 are adhesively secured together after visually recognizing on a microscope that the direction of array of the two stress applicators 18a are disposed at an angle of 45° with respect to the reference surface 31a, as shown in phantom lines in FIG. 2. The carrier 31 is subsequently secured to the optical integrated circuit 14 in the similar manner as mentioned above with reference to FIG. 3. The connection between the polarization maintaining optical fiber 21 and the optical waveguide 15 takes place in the similar manner.

However, making the direction in which the stress applicators are arrayed to be disposed at an angle of 45° with respect to the reference surface 31a by a visual recognition can only be achieved with a poorer accuracy of angular alignment as compared with making the array direction of the stress applicators to be parallel to the reference surface 31a. By way of example, an offset of the angular alignment when making the direction of the array to be parallel to the reference surface 31a is several degrees per hour as considered in terms of the bias error of the fiber optic gyroscope, but a corresponding offset in the angular alignment when making the direction of array to be at an angle of 45° with respect to the reference surface 31a increases to as much as several tens of degrees per hour as considered in terms of the bias error. This means that if the polarization axis of each of the polarization maintaining optical fiber 18 or 21 is not disposed properly at an angle of 45° with respect to the direction of the electric field of the TE mode of the optical wave guide 15, a light beam which is incident on the single mode fiber optic coil 20 cannot be in an exactly non-polarized condition, leading to a degradation in the accuracy of detecting the angular rate.

An open loop fiber optic gyroscope which uses a substrate-based optical integrated circuit is disclosed in Japanese Patent Kokai Publication No. 29,184/96 (published Feb. 2, 1996), for example. The difficulties mentioned above which occur in the substrate-based optical integrated circuit can similarly be overcome for such an open loop fiber optic gyroscope when every optical path of the optical integrated circuit which is disposed toward the light source is constructed with a polarization maintaining optical fiber as shown in FIG. 1 and when a polarization maintaining optical fiber is inserted between the optical integrated circuit and the fiber optic coil. However, the issue of the angular alignment when connecting the optical integrated circuit and the polarization maintaining optical fiber which is disposed toward the coil remains in the similar manner.

SUMMARY OF THE INVENTION

It is an object of the present invention to provide a fiber optic gyroscope which is capable of making a light beam which impinges on a single mode fiber optic coil from an optical integrated circuit having the function to serve as a polarizer and having an optical waveguide to be in an exactly non-polarized condition.

The present invention relates to a fiber optic gyroscope in which a light beam from a light source is passed through an optical fiber and an optical fiber coupler to impinge on a substrate-based optical integrated circuit having the function to serve as a polarizer and having a branching optical waveguide where light beams which are branched by the optical integrated circuit are caused to impinge on the opposite ends of a single mode fiber optic coil as a clockwise rotating light beam and a counter-clockwise rotating light beam, and after propagation through the fiber optic coil, the clockwise and the counter-clockwise rotating light beam are coupled together in the optical integrated circuit to produce an interference, a resulting interference beam is introduced by the fiber coupler into a light receiver to convert the intensity of the interference beam into an electrical signal, from which the angular rate of rotation about the axis which is applied to the fiber optic coil is detected. In accordance with the present invention, the fiber optic gyroscope comprises a first and a second polarization maintaining optical fiber each having an polarization axis which is coincident with the direction of the electric field of the TM mode in the branching optical waveguide have its one end connected to two incident and emitting end faces of the branching optical waveguide of the optical integrated circuit, and a third and a fourth polarization maintaining optical fiber have its one end connected to the other end of the first and the second polarization maintaining optical fiber with an offset of their polarization axis by 45°. The other ends of the third and the fourth plane-of-polarization optical fiber are connected to the opposite ends of the fiber optic coil. The third polarization maintaining optical fiber has the length of L according to the inequality (1) described in the background of the invention, while the fourth polarization maintaining optical fiber has a length equal to or greater than 2L.

With the arrangement of the present invention as described above, the angular alignment of 45° which is required to serve as a depolarizer can be achieved through a connection between the optical fibers, and this connection can be made by using a commercially available polarization maintaining optical fiber fusion connector which performs a fusion connection of the optical fibers while assuring that a desired relative angle can be accurately achieved through an image analysis when the stress applicators within the polarization maintaining optical fibers are laterally observed in an optical manner. This allows light beams which are assured to be in a properly non-polarized condition to be made incident on the opposite ends of the single mode fiber optic coil, resulting in a fiber optic gyroscope having a high accuracy of detection.

DETAILED DESCRIPTION OF PREFERRED EMBODIMENTS

An embodiment in which the present invention is applied to a closed loop fiber optic gyroscope will now be described with reference to FIG. 4. It is to be noted that in FIG. 4, elements and parts corresponding to those shown in FIG. 1 are designated by like reference characters, and will not be described specifically unless otherwise required.

Light beam emitted from a light source 10 is passed through a first optical fiber 51, an optical fiber coupler 52, a second optical fiber 53 and a third optical fiber 54 to impinge on a substrate-based optical integrated circuit 14. In the present embodiment, the first and the second optical fiber 51 and 53 and the optical fiber coupler 52 are constructed with a single mode optical fiber while the third optical fiber 54 is constructed with a polarization maintaining optical fiber having a length L. The third optical fiber 54 has an polarization axis 33 which coincides with the direction of the electric field Ex of the TE mode in the optical waveguide 15 of the optical integrated circuit 14 (this will be further described later in connection with the connection between the first optical fiber 55 and the optical waveguide 15 with reference to FIG. 5). It is assumed here that one unit of the length for the polarization maintaining optical fiber which provides a sufficient group delay time difference between the two orthogonal linear polarizations to prevent a coherence from occurring in the light beam from the light source is denoted by L.

The substrate-based optical integrated circuit 14 has the function to serve as a polarizer and has a branching optical waveguide. By way of example, Y-branch optical wave guide 15 which is fabricated according to the proton exchange method is formed on the substrate which is formed by an optical crystal of lithium niobate (LiNbO$_3$) in the similar manner as in the prior art mentioned above. Similarly, in the present embodiment, two light modulators 16 and 17 are provided. It is to be noted that the use of a polarization maintaining optical fiber of a short length for connection with the optical integrated circuit 14 while an optical path of the optical integrated circuit 14 which is disposed toward the light source 10 principally comprises a single mode optical fiber has been proposed by the present inventors in pending U.S. patent application Ser. No. 10/700,312.

The light beam which is incident on the Y-branch optical waveguide 15 is branched into a first and a second light beam. In the present embodiment, the first light beam is passed through a fourth optical fiber 55 and a fifth optical fiber 56 to impinge on one end of a fiber optic coil 20, propagating clockwise therethrough. The second branched light beam is passed through a sixth optical fiber 57 and a seventh optical fiber 58 to be incident on the other end of the fiber optic coil 20, propagating counter-clockwise therethrough. The light beam propagating in the CW direction and the light beam propagating in the CCW direction through the fiber optic coil 20 are coupled together in the Y-branch optical waveguide 15 and is then branched by the optical fiber coupler 52 to be input to a light receiver 25, which delivers an electrical signal which depends on the intensity of the interference beam.

Figure 5:
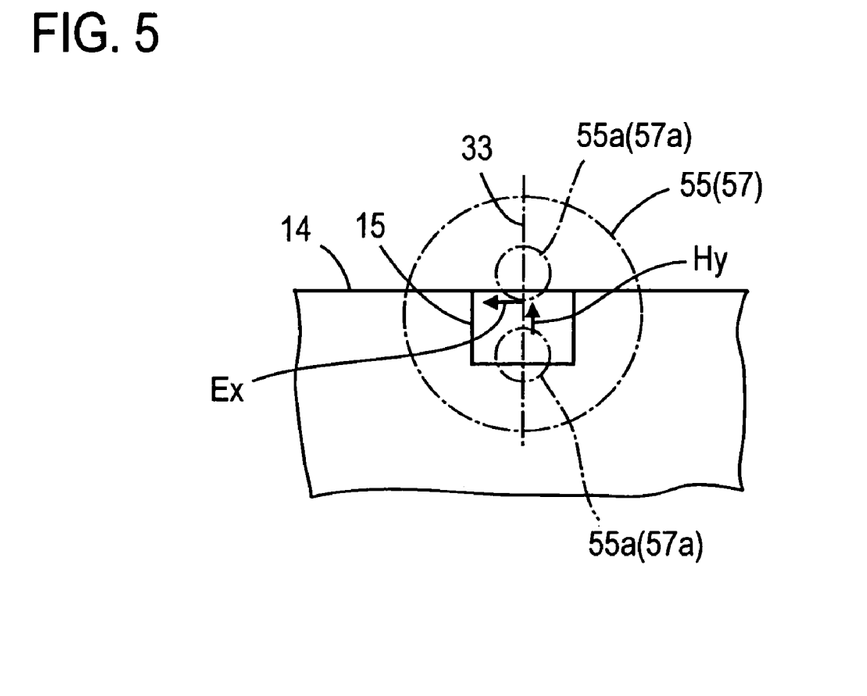
FIG. 5 is an illustration of a relationship between the direction of the electric field Ex of the TE mode in the optical waveguide 15 of the optical integrated circuit 14 and the polarization axis of the polarization maintaining optical fiber 55 (or 57)
Figure 6:
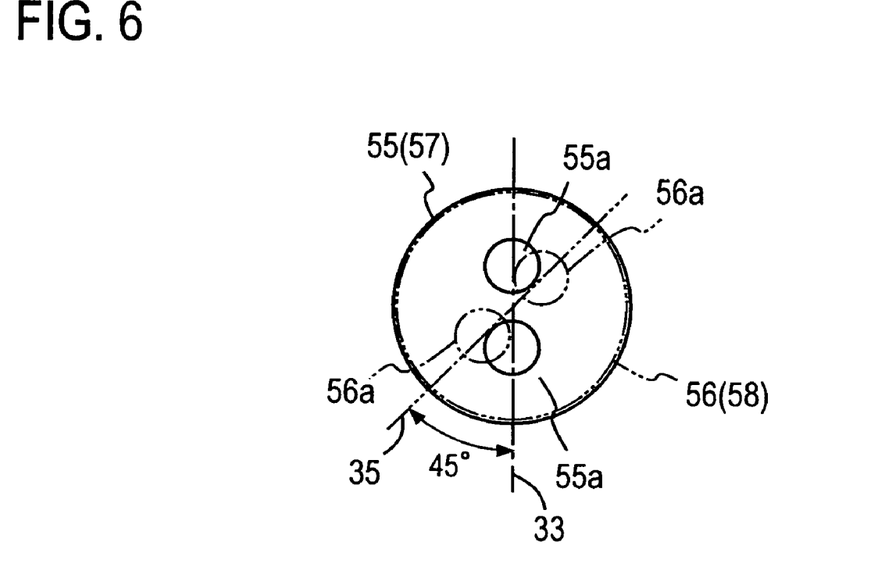
FIG. 6 is an illustration of a relationship between the polarization maintaining optical fiber 55 (or 57) and 56 (or 58) and the polarization axis.

The fourth, the fifth, the sixth and the seventh optical fiber 55, 56, 57 and 58 are each constructed with a polarization maintaining optical fiber. The point of fusion between these optical fibers is indicated by a thick line. As shown in FIG. 5, the polarization axis of the fourth and the sixth optical fiber 55 and 57, which is the polarization axis aligned with the rapid phase axis in this example, or the direction perpendicular to the direction 33 in which two stress applicators 55a and 57a are each arrayed, is in the same direction as the direction of the electric field Ex of the TE mode in the respective optical waveguide 15 of the optical integrated circuit 14, and is offset by an angle of 45° from the rapid phase axis of each of the fifth and the seventh optical fiber 56 and 58 (which axis lies perpendicular to the direction 35 in which two stress applicators 56a and 58a are each arrayed, in the present example), as shown in FIG. 6. In the illustration, the optical fibers 55 and 56 are shown slightly offset to provide a distinction between them.

Finally, it is to be noted that in the present embodiment, the fourth to the seventh optical fiber 55, 56, 57 and 58 each have a length L2, L3, L4 and L5, respectively, which are equal to or greater than 2L, 8L, 4L and 16L, respectively, and the difference in the length of any two optical fibers is chosen to be equal to or greater than 1L.

With the described arrangement, because the third optical fiber 54 has a length equal to or greater than L, the orthogonal linear polarizations which impinge on the optical integrated circuit 14 from the third optical fiber 14 are free from the interference. Accordingly, if a stray beam which occurs within the substrate of the optical integrated circuit 14 becomes recoupled during the propagation through the optical waveguide 15 or upon incidence on the fourth and the sixth optical fiber 55 and 57, there is no influence of the recoupled beam in the similar manner as in the arrangement shown in FIG. 1.

Since the direction of the electric field of the TE mode in the optical waveguide 15 is parallel to the polarization axis of each polarization maintaining optical fiber 55 and 57, the connection between the optical waveguide 15 and the fourth and the sixth optical fiber 55 and 57 can be achieved with a high accuracy of angular alignment, and accordingly, a light beam which is incident on the fourth and the sixth optical fiber 55 and 57 is substantially only the light beam in the TE mode which propagates along the rapid phase axis of the polarization maintaining optical fiber in the present example. In addition, when the fourth and the sixth optical fiber 55 and 57 are connected with the fifth and the seventh optical fiber 56 and 58, respectively, the connection is made with an offset of 45° between the inherent axes with a high accuracy. Accordingly, substantially only the rapid phase axis linear polarization is split into the rapid phase axis and the slow phase axis for incidence from the fourth and the sixth optical fiber 55 and 57 onto the fifth and the seventh optical fiber 56 and 58, respectively.

Since the fifth and the seventh optical fiber 56 and 58 have respective length L3 and L5 which are equal to or greater than L and which are in the ratio of 1:2, light beams which are incident on the fiber optic coil 20 from the fifth and the seventh optical fiber 56 and 58 are properly in their non-polarized condition, whereby the fifth and the seventh optical fiber 56 and 58 serve as an LYOT-type depolarizer, allowing light beams which are incident on the optical integrated circuit 14 from the fiber optic coil 20 to be properly in their non-polarized condition. Accordingly, the influence of a recoupling of a stray beam which may be produced by these light beams within the optical integrated circuit 14 is avoided. It is found that the birefringence of the single mode optical fiber which forms the fiber optic coil 20 is less than the birefringence of the polarization maintaining optical fiber by a factor of two to three orders of magnitude and that the birefringence occurs randomly here and there to make the measurement difficult, but that such randomness is effective in canceling out as a whole, allowing the existence of the birefringence to be disregarded.

From the foregoing description, it will be seen that the lengths L2 and L4 of the fourth and the sixth optical fiber 55 and 57 can be reduced as much as possible, concomitant with the requirement of facilitating the connection between the fourth and the sixth optical fiber 55 and 57 on one hand and the optical waveguide 15 as well as the fifth and the seventh optical fiber 56 and 58 on the other hand. In this respect, a choice may be made that L2=L4. In this manner, with the fiber optic gyroscope according to the present invention, the axis alignment required to achieve the parallelism can be performed in a relatively simple manner and with a relatively high accuracy, and the angular alignment of 45° can be achieved with a high accuracy using a commercial available connector, contributing to increasing the accuracy of the detecting the angular rate. In the present example, the polarization maintaining optical fiber which is used in an optical path disposed beyond the optical integrated circuit 14 toward the light source 10 may have a reduced length of ten and several centimeters, for example, allowing a more inexpensive arrangement to be formed in comparison to the arrangement shown in FIG. 1 where a length equal to or greater than 1 m is required.

When the light beam is incident on the third optical fiber 54 from the optical integrated circuit 14, there is a possibility that a stray beam in the TM mode may be incident on the third optical fiber 54, subject to a mode conversion to cause the TE mode including a recoupled stray beam to be incident as the slow axis propagating beam on the third optical fiber 54 though in a small amount. However, in the present example, a difference between the sum L2+L3 of the lengths of the fourth and the fifth optical fiber 55 and 56 and the sum L4+L5 of the lengths of the sixths and the seventh optical fiber 57 and 58 is greater than the length L of the third optical fiber 54, and accordingly, there is no likelihood that a coherence could occur between the orthogonal linear polarizations or between the rapid phase axis beam and the slow phase axis beam which are emitted from the third optical fiber 54 toward the light source 10 if a phase difference or a distance between the wave fronts between the rapid phase axis propagating beam and the slow phase axis propagating beam which are formed during the propagation through the polarization maintaining optical fiber is reduced during the propagation through the third optical fiber 54.

Making the direction of the electric field of the TE mode in the optical waveguide 15 to be parallel to the rapid phase axis of each of the fourth and the sixth optical fiber 55 and 57 can be achieved with a relatively high accuracy, as mentioned previously. However, because this axis alignment takes place through the visual recognition, the accuracy achieved is limited. For this reason, a slight amount of the slow phase axis propagating beam from the fourth and the sixth optical fiber 55 and 57 may be incident from the optical waveguide 15. It is preferred that this influence can be eliminated. In this respect, it is desirable that a difference between each length L2, L4 of the fourth and the sixth optical fiber 55 and 57 and the length L of the third optical fiber 54 be chosen to be equal to or greater than L.

It is also desirable that an LYOT-type depolarizer be constructed by the combination of the fourth and the fifth optical fiber 55 and 56 and also by the combination of the sixth and the seventh optical fiber 57 and 58 and that an LYOT-type depolarizer be constructed by the combination of the fourth and the fifth optical fiber 55 and 56 and the sixth and the seventh optical fiber 57 and 58. In this respect, a choice is made in the present embodiment that L2=2L or greater, L3=4L or greater, L4=8L or greater and L5=16L or greater and that a difference between any two of these values be equal to or greater than L. In this manner, there can be obtained a fiber optic gyroscope having a considerably high accuracy of detecting the angular rate.

It will be understood from the foregoing description that if the axis alignment between the third, the fourth and the sixth optical fiber 54, 55 and 57 and the optical waveguide 15 is properly made during the connection therebetween, a group delay difference between the linear polarization which is TE mode coupled to the optical wave guide 15 and the linear polarization which is TM mode coupled to the optical wave guide 15 through the third optical fiber 54 will become further greater in the fourth optical fiber 55 if a stray beam in the TM mode is coupled to the fourth optical fiber 55 during the coupling between the optical waveguide 15 and the fourth optical fiber 55, for example. Accordingly, it is required in any case that on the premise that L1, L3 and L5 are all equal to or greater than 1:

$$|(L1+L2)-L3| \geq L, |(L1+L4)-L5| \geq L \qquad (2)$$

and that in order to avoid the influence of random birefringence during the propagation through the fiber optic coil 20:

$$||(L1+L2)-L3|-|(L1+L4)-L5|| \geq L \qquad (3)$$

It should be understood that |a−b| represents the absolute value of a difference between a and b. Alternatively, the requirement may be chosen such that the inequalities (2) be satisfied and that the absolute value of a difference between L3 and L5 be equal to or greater than L or the ratio of L3 to L5 be 1:2 or 2:1. Where one of the requirements defined by the inequalities (2) applies as an equality, the remaining requirement may be changed as being equal to or greater than 2L. If such requirements are met, a choice may be made such that L2=L4. It should also be noted that among the lengths L1 to L5, L1 need not be chosen as the smallest value. Also, the requirements may be changed to |L1−L3|≧L, |L1−L5|≧L and ||L1−L3|−|L1−L5||≧L.

The suppression of an influence which results from a slight axis misalignment during the connection between the third, the fourth and the sixth optical fiber 54, 55 and 57 and the optical waveguide 15 will now be described. In such instance, the rapid phase axis polarization component from the third optical fiber 54 may propagate through the fourth optical fiber 55, though slightly, as the slow phase axis polarization or the slow phase axis polarization component which appears as a stray beam may propagate as a rapid phase axis polarization. Accordingly, there appears a component which reduces the phase difference or the group delay difference between the rapid phase axis polarization component and the slow phase polarization component which occur in the third optical fiber 54 during the propagation through the fourth optical fiber 55. Hence, it is required that L2 and L4 be also equal to or greater than L and the following inequalities (4) must be satisfied:

$$|L1-L2|\geq L, |L1-L4|\geq L \quad (4)$$

The both linear polarizations from the fourth optical fiber 55 are equally distributed into the rapid phase axis and the slow phase axis in the fifth optical fiber 56. Consequently, there appears a component during the propagation through the fifth optical fiber 56 which further reduces the group delay difference (phase difference) which is once reduced. For this reason, the following inequalities (5) must be satisfied:

$$||L1-L2|-L3|\geq L, ||L1-L4|-L5|\geq L \quad (5)$$

In addition, in order to avoid the influence of a random birefringence during the propagation through the fiber optic coil 20, the following inequality must also be satisfied:

$$|||L1-L2|-L3|-||L1-L4|-L5|||\geq L \quad (6)$$

In other words, if one of the equalities (5) is satisfied as an equality, the other requirement is changed to be equal to or greater than 2L. It follows that in the shortest case, the ratio will be 1:2 or 2:1. What is required is to satisfy such requirements, and among the length L1 to L5, L1 need not be the minimum value.

Figure 7:
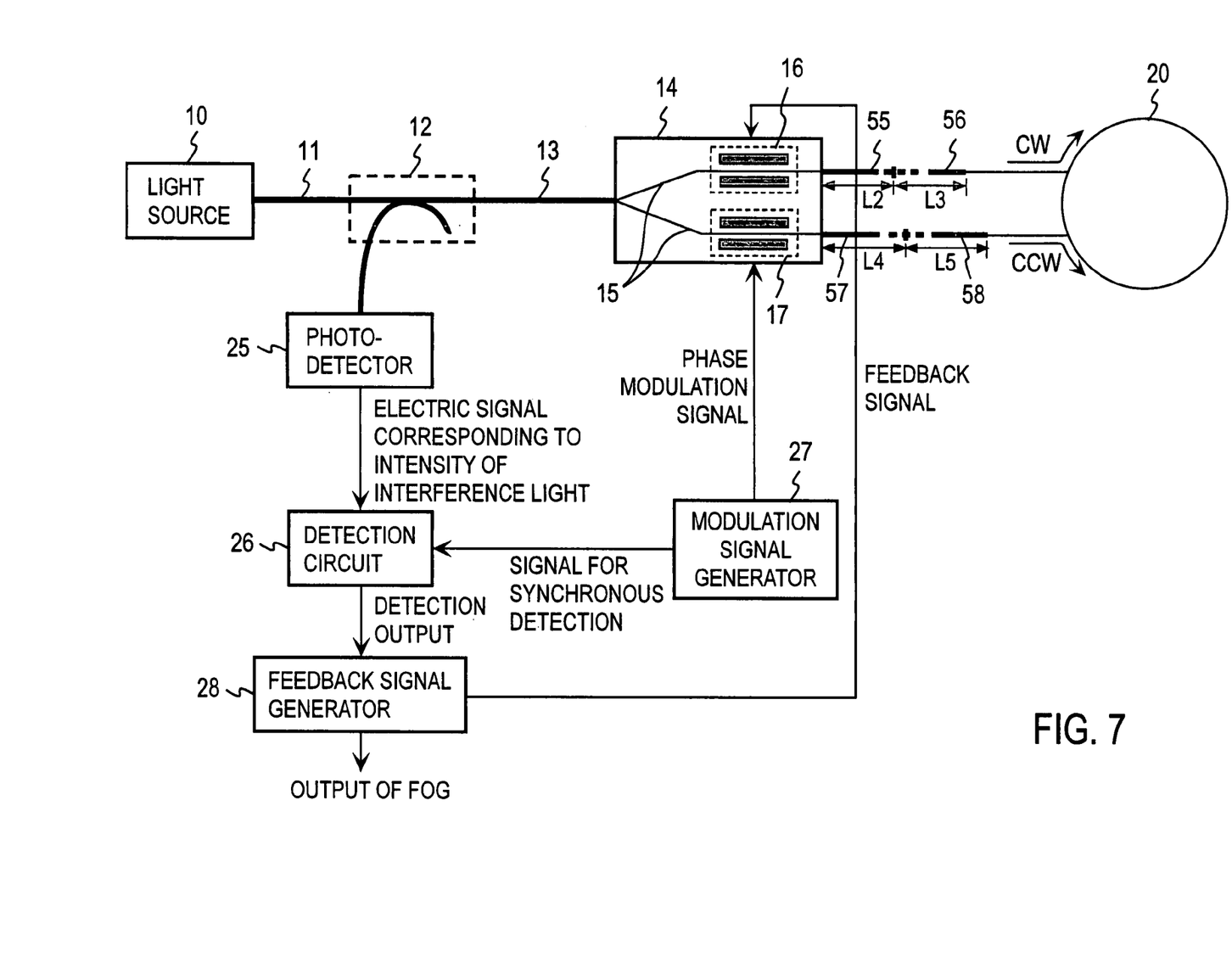
FIG. 7 is a block diagram of another embodiment of the present invention.

What is most important in the practice of the present invention resides in that the axis misalignment should be avoided in the connection between the optical waveguide and that polarization maintaining optical fiber located toward the fiber optic coil 20 and which is directly connected to the optical integrated circuit 14 and that the connection which requires an angular offset of 45° be made between the polarization maintaining optical fibers. Therefore, the optical path disposed on the side of the optical integrated circuit 14 which is located nearer the light source 10 may entirely be constructed with the polarization maintaining optical fibers in the similar manner as shown in FIG. 1. This arrangement is shown in FIG. 7 where the paths corresponding to those shown in FIGS. 1 and 4 are designated by like reference characters.

In this instance, the polarization maintaining optical fiber which is located on the side of the optical integrated circuit 14 disposed nearer the light source 10 has a length which may be as long as 1 m or greater, for example, as mentioned previously. Accordingly, a group delay difference (phase difference) between the orthogonal polarizations which occurs in this polarization maintaining optical fiber is substantially greater than the group delay difference (phase difference) between the orthogonal polarizations which occurs on the side of the optical integrated circuit 14 located nearer the fiber optic coil 20. Accordingly, where the influence of the axis misalignment between the optical waveguide 15 and the third, the fourth and the sixth optical fiber 54, 55 and 57 can be neglected, it is sufficient that the following inequalities be satisfied:

$$L3\geq L, L5\geq L, |L3-L5|\geq L \quad (7)$$

Where it is desired to suppress the influence of the axis misalignment, this can be achieved by satisfying the following requirements:

$$|L2-L3|\geq L, |L4-L5|\geq L$$

$$||L2-L3|-|L4-L5||\geq L \quad (8)$$

While in the foregoing description, the requirement for the length of each polarization maintaining optical fiber has been described as being equal to or greater than a given value, it is seen that the shortest lengths which satisfy individual requirements are preferred for economic reasons.

Figure 4:
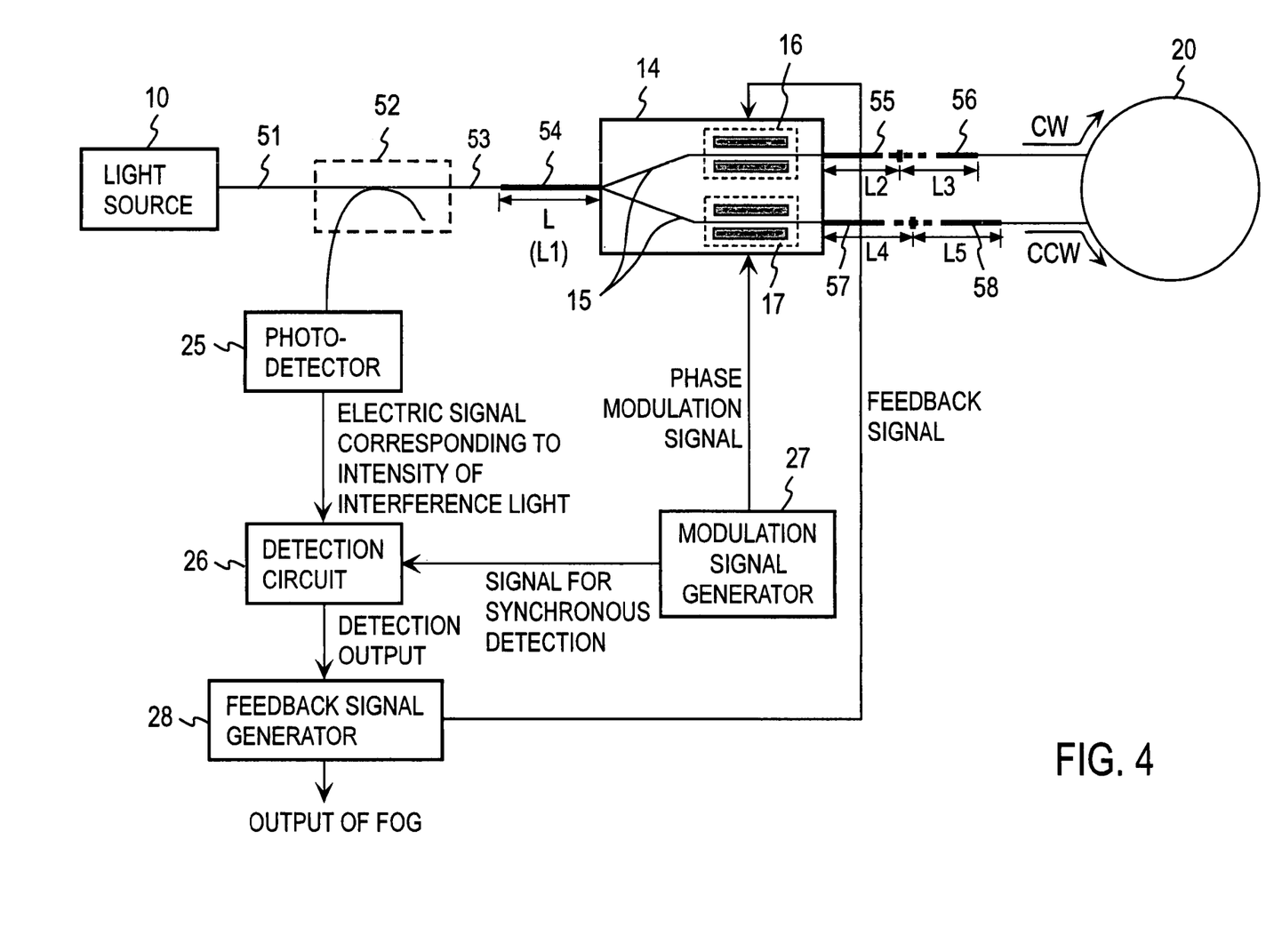
FIG. 4 is a block diagram of an embodiment of the present invention.

What has been described above in terms of the embodiments represents the application of the present invention to a closed loop fiber optic gyroscope. However, it should be understood that the invention can equally be applied to an open loop fiber optic gyroscope with a similar functioning and effect. While an optical integrated circuit having a Y-branch optical waveguide which is fabricated on a substrate of optical crystal lithium niobate ($LiNbO_3$) using the proton exchange method is used in the described embodiments, the substrate of an optical crystal may be formed by lithium titanate ($LiTiO_3$). Alternatively, an optical integrated circuit including an optical waveguide of lithium niobate of titanium diffusion type which is capable of propagating the both polarization modes, or light beams in both the TE mode and the TM mode, and which includes some sort of polarizer as a local device disposed on a part of the waveguide may also be used. In sum, what is required for the optical integrated circuit is that it has the function to serve as a polarizer and includes a branching optical waveguide. A polarization maintaining optical fiber is not limited to the type including a pair of stress applicators, but many other types may also be used.

Where the optical fibers 55 and 57 are omitted in the arrangement of FIG. 4, and the optical fibers 56 and 58 are directly connected to the optical waveguide 15 with their polarization axis displaced by an angle of 45° with respect to the direction of the electric field of the TE mode, the lengths of the optical fibers are required to satisfy the following: L1≧L, L3≧L, L5≧L, |L1−L3|≧L, |L1−L5|≧L and ||L1−L3|−|L1−L5||≧L.

What is claimed is:
1. A fiber optic gyroscope comprising:
a light source;
an optical fiber;
an optical fiber coupler;
a substrate-based optical integrated circuit;
a single mode fiber optic coil; and
a light receiver;
wherein a light beam from the light source passes through the optical fiber and the optical fiber coupler to the substrate-based optical integrated circuit;
wherein the optical integraged circuit serves as a polarizer and a branching optical waveguide for branching the light beam into into two beams that are incident on opposite ends of the single mode fiber optic coil;
wherein the two beams pass through the single mode fiber optic coil as a clockwise rotating beam and a counter- clockwise rotating beam and are coupled together in the optical integrated circuit to produce an interference beam;

wherein the interference beam passes through the optical fiber coupler to the light receiver; and wherein the light receiver converts intensity of the interference beam into an electrical signal for detecting an angular rate applied to the fiber optic coil about the axis thereof;

the fiber optic gyroscope further comprising:

a first polarization maintaining optical fiber connected between the optical fiber coupler and the optical waveguide of the optical integrated circuit such that light passing from the first polarization maintaining fiber is directly incident on the optical integrated circuit, wherein the first polarization maintaining optical fiber has a polarization axis coincident with the direction of the TE mode in the optical waveguide, the first optical fiber having a length L1;

a second and a third polarization maintaining optical fiber connected to end faces of the optical waveguide of the optical integrated circuit, where the polarization axes of the second and third polarization maintaining optical fiber are coincident with the direction of the TE mode in the optical waveguide, the second and the third optical fiber having a length of L2 and L4, respectively;

and a fourth and a fifth polarization maintaining optical fiber having one end connected to the second and the third polarization maintaining optical fiber, respectively, where relative polarization axes of connected optical fibers are displaced by an angle of 45°, the fourth and the fifth optical fiber having another end connected to the opposite ends of the fiber optic coil, the fourth and the fifth optical fiber having a respective length of L3 and L5;

wherein L denotes a length required to produce a group delay time difference between orthogonal polarizations in each of the polarization maintaining optical fibers which is in excess of the coherence length of a light beam from the light source, the fiber lengths satisfy the following:

$L1 \geq L, L3 \geq L, L5 \geq L$ $|(L1+L2)-L3| \geq L, |(L1+L4)-L5| \geq L$ $\||(L1+L2)-L3|-|(L1+L4)-L5|\| \geq L.$ 2. A fiber optic gyroscope according to claim 1, wherein:

$|L1-L3| \geq L, |L1-L5| \geq L$ $\||L1-L3|-|L1-L5|\| \geq L.$

3. A fiber optic gyroscope according to claim 1, wherein:

$L2 \geq L, L4 \geq L,$ $\||L1-L2|-L3\| \geq L$ $\||L1-L4|-L5\| \geq L$ $\|\||L1-L2|-L3|-||L1-L4|-L5\|\| \geq L.$ 4. A fiber optic gyroscope according to claim 3, wherein:

$L2 \geq 2L, L3 \geq 4L, L4 \geq 8L, L5 \geq 16L.$

5. A fiber optic gyroscope comprising:

a light source;
a first polarization maintaining optical fiber;
a polarization maintaining optical fiber coupler;
a substrate-based optical integrated circuit;
a single mode fiber optic coil; and
a light receiver;

wherein a light beam from the light source passes through the first polarization maintaining optical fiber and the polarization maintaining optical fiber coupler to the substrate-based optical integrated circuit wherein the optical integrated circuit serves as a polarizer and a branching optical waveguide for branching the light beam into two beams that are incident on opposite ends of the single mode fiber optic coil;

wherein the two beams pass through the single mode fiber optic coil as a clockwise rotating beam and a counter-clockwise rotating beam and are coupled together in the optical integrated circuit to produce an interference beam;

wherein the interference beam passes through the optical fiber coupler into the light receiver; and wherein the light receiver converts intensity of the interference beam into an electrical signal for detecting an angular rate applied to the fiber optic coil about the axis thereof;

the fiber optic gyroscope further comprising:

a second and a third polarization maintaining optical fiber connected to end faces of the optical waveguide of the optical integrated circuit where the polarization axes of the second and the third optical fiber are coincident with the direction of the TE mode of the optical waveguide, the second and the third optical fiber having a respective length of L2 and L4;

and a fourth and a fifth polarization maintaining optical fiber having one end connected to the second and the third polarization maintaining optical fiber, respectively, where relative polarization axes of connected optical fibers are displaced by an angle of 45°, the fourth and the fifth optical fiber having another end connected to the opposite ends of the fiber optic coil, the fourth and the fifth optical fiber having a respective length of L3 and L5;

wherein L denotes a length required to produce a group delay time difference between orthogonal polarizations in each polarization maintaining optical fiber which is in excess of the coherence length of a light beam from the light source, the fiber lengths satisfy the following:

$L3 \geq L, L5 \geq L, |L3-L5| \geq L.$

6. A fiber optic gyroscope according to claim 5, wherein;

$|L2-L3| \geq L, |L4-L5| \geq L$ $\||L2-L3|-|L4-L5|\| \geq L.$

* * * * *

UNITED STATES PATENT AND TRADEMARK OFFICE
CERTIFICATE OF CORRECTION

PATENT NO. : 7,190,462 B2
APPLICATION NO. : 10/797731
DATED : March 13, 2007
INVENTOR(S) : Aritaka Ohno and Ryuji Usui It is certified that error appears in the above-identified patent and that said Letters Patent is hereby corrected as shown below:

Title Page, item (75) inventor Ryuji Usui's residence "Kanagawa" should be -- Tokyo --.

Signed and Sealed this

Fourteenth Day of August, 2007

JON W. DUDAS
*Director of the United States Patent and Trademark Office*